United States Patent
Jhung et al.

(10) Patent No.: US 7,297,652 B2
(45) Date of Patent: *Nov. 20, 2007

(54) METHOD OF PREPARING A NANOPOROUS NICKEL PHOSPHATE MOLECULAR SIEVE

(75) Inventors: Sung Hwa Jhung, Daejeon (KR);
Jong-San Chang, Daejeon (KR);
Sang-Eon Park, Daeheon (KR);
Anthony K. Cheetham, Santa Barbara, CA (US)

(73) Assignee: Korea Research Institute of Chemical Technology, Yusung-ku, Daejeon (KR)

( * ) Notice: Subject to any disclaimer, the term of this patent is extended or adjusted under 35 U.S.C. 154(b) by 427 days.

This patent is subject to a terminal disclaimer.

(21) Appl. No.: 10/875,962

(22) Filed: Jun. 25, 2004

(65) Prior Publication Data

US 2005/0043168 A1    Feb. 24, 2005

(30) Foreign Application Priority Data

Aug. 18, 2003   (KR) ................... 10-2003-0057002

(51) Int. Cl.
*B01J 29/04* (2006.01)
*B01J 29/82* (2006.01)
(52) U.S. Cl. .................. 502/60; 502/208; 502/213
(58) Field of Classification Search ............ 502/60, 502/208, 213
See application file for complete search history.

(56) References Cited

FOREIGN PATENT DOCUMENTS

EP    1508371 A1 *    2/2005

OTHER PUBLICATIONS

Jhung et al., "Template-Free Synthesis of the Nanoporous Nickel Phosphate VSB-5 under Microwave Irradiation", Chem. Mater, 16, pp. 1394-1396, 2004, no month available.*
Hartmann et al., "Transition-Metal Ions in Aluminophosphate and Silicoaluminophosphate Molecular Sieves; Location, Interaction with Adsorbates and Catalytic Properties", Chemical Reviews, vol. 99, No. 3, pp. 635-663, Mar. 1999.*
Paul M. Forster et al.; "Hydrogen Adsorption in Nanoporous Nickel(II) Phosphates", *J. Am. Chem. Soc.*, 125, pp. 1309-1312, (2003).
Nathalie Guillou et al.; "Nickel(II) Phosphate VSB-5: a Magnetic Nanoporous Hydrogenation Catalyst With 24-Ring Tunnels", *Angew. Chem. Int. Ed.*, 40, pp. 2831-2834, (2001).

* cited by examiner

*Primary Examiner*—Elizabeth D. Wood
(74) *Attorney, Agent, or Firm*—Finnegan, Henderson, Farabow, Garrett & Dunner, LLP

(57) ABSTRACT

The present invention relates to a process for preparing nanoporous VSB-5 molecular sieves, and more particularly, to a process for preparing nanoporous VSB-5 molecular sieves useful as a hydrogen storage material, a catalyst, a catalyst supporter and an adsorbent, performed in such a manner that low-cost inorganic base or monoamine instead of a template essential in the conventional process is, as a pH modifier, incorporated into raw materials comprised of nickel and phosphorous compounds and crystallized to give VSB-5 molecular sieves in an economical and efficient manner.

8 Claims, 1 Drawing Sheet

METHOD OF PREPARING A NANOPOROUS NICKEL PHOSPHATE MOLECULAR SIEVE

BACKGROUND OF THE INVENTION

1. Field of the Invention

The present invention relates to a process for preparing nanoporous VSB-5 molecular sieves, and more particularly, to a process for preparing nanoporous VSB-5 molecular sieves useful as a hydrogen storage material, a catalyst, a catalyst supporter and an adsorbent, performed in such a manner that low-cost inorganic base or monoamine instead of a template essential in the conventional process is, as a pH modifier, incorporated into raw materials comprised of nickel and phosphorous compounds and crystallized to give VSB-5 molecular sieves in an economical and efficient manner.

2. Description of the Related Art

A nanoporous material of nickel and phosphorous, the so-called VSB-5 molecular sieve with pore openings composed of 24-membered ring of oxygen atoms has pores of about 6.4 Å, exhibits a catalytic activity for selective hydrogenation and dehydrogenation, and shows relatively higher thermal stability. Therefore, the VSB-5 molecular sieve has been highlighted as a porous solid inorganic material standing comparison with conventional zeolitic molecular sieves.

However, the synthesis procedures for VSB-5 molecular sieve have not been suggested yet in diverse manners. The representing process comprises the addition of the diamine bases from 1,2-ethylene diamine to 1,8-octane diamine to nickel and phosphorous compounds (*J. Am. Chem. Soc.*, 125:1309-1312(2003); and *Angew. Chem. Int. Ed.*, 40:2831-2834(2001)). As the diamine base, 1,3-diaminopropane (DAP) is mainly employed. The composition of VSB-5 molecular sieve includes as mole ratio of about 1.0 Ni: 2.1 P: 5.0 DAP: 140 $H_2O$, which undergoes a hydrothermal reaction for 5-6 days at 180° C. to yield VSB-5 molecular sieve. However, the diamines used a base are generally expensive and requires heat treatment for the removal of amines after the synthesis of VSB-5 molecular sieve. Furthermore, the heat treatment results in the disruption or occlusion of pore structures of VSB-5 molecular sieve, which highly decreases the surface area of VSB-5 molecular sieve to exhibit the reduced efficiency on its application.

Therefore, there remains a need in the art for the development of a novel process for preparing VSB-5 molecular sieve by use of low-cost amines, not requiring the heat treatment.

SUMMARY OF THE INVENTION

The present inventors have made intensive researches to overcome the shortcomings described above, and as a result, found a novel process in which a low-cost inorganic base or monoamine instead of diamines as a template essential in the conventional process is used to produce VSB-5 molecular sieve under the control of pH. Moreover, it has been surprisingly found that the inorganic base enables to avoid the post heat treatment, so that the process for producing VSB-5 molecular sieve may be simplified.

Accordingly, the object of this invention is to provide a process for VSB-5 molecular sieves with improved physical properties in an economical and efficient manner.

DETAILED DESCRIPTION OF THIS INVENTION

Figure 1:
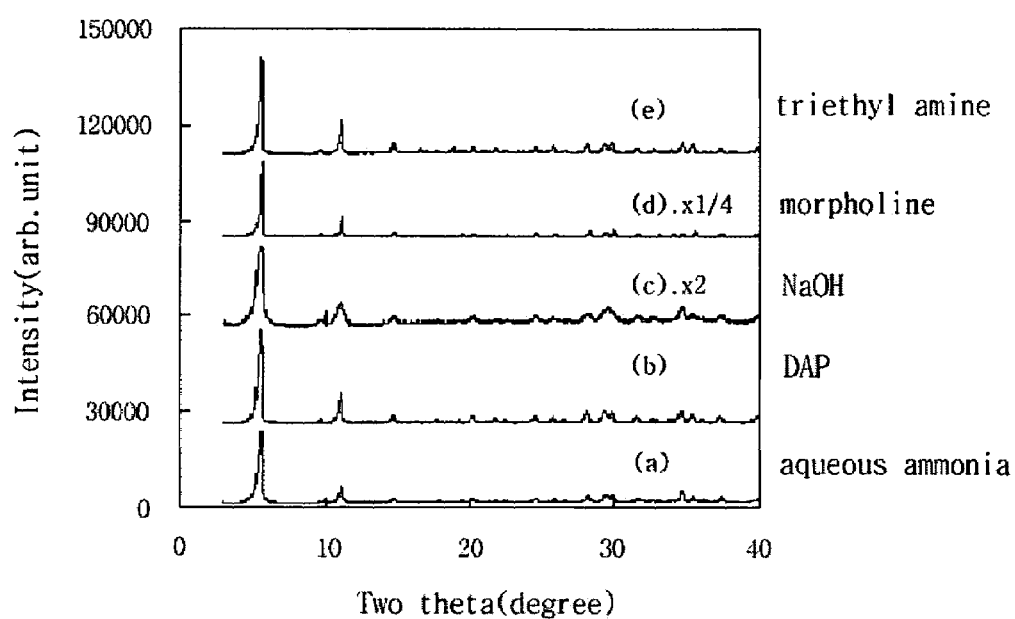
FIG. 1 represents the XRD spectrum of VSB-5 molecular sieves produced from Example 1 (a), Comparative Example 1 (b) and Examples 2-4 (c, d and e).

The present invention is directed to a process for preparing a VSB-5 molecular sieve by crystallizing a nickel compound and a phosphorous compound with a base, wherein the base is an inorganic base or monoamine and the crystallizing is performed at a temperature ranging from 50 to 350° C. and pH of 7.0 to 12.0.

The present invention will be described in more detail as follows:

The present invention is drawn to a process for preparing VSB-5 molecular sieve in an economical and efficient manner using low-cost inorganic base or monoamine instead of high-cost diamines as a base component involved in crystallization in the synthesis of VSB-5 molecular sieve.

The technical feature of the present invention is that VSB-5 molecular sieve with nanopores is prepared using nickel compound and phosphorous compound as raw materials and inorganic base or monoamine as a pH modifier to avoid the employment of a template which has been required. In particular, the use of the inorganic base permits the overall process to be simplified, since the post-heat treatment at a high temperature necessary to remove organic materials contained in pores in the process by use of amine bases may be avoided.

Examples of a nickel compound to be used as a raw material having a certain degree of solubility to a given solvent, include inorganic nickel compound such as nickel chloride hydrate and nickel nitrate hydrate, and organic nickel compound such as nickel oleate and nickel oxalate. Of them, nickel chloride hexahydrate is most preferred. Phosphorous compound having a certain degree of solubility to a given solvent can be used as another raw material, which includes inorganic and organic phosphorous compounds such as phosphoric acid and tri-butylphosphate. Of them, phosphoric acid is most preferred.

As to the amount of the nickel and phosphorous compounds as a raw material, it is preferred that the phosphorous compound be used in the mole ratio of from 0.3 to 3.0 to 1 mole of the nickel compound to maintain the mole ratio of (P/Ni) to 0.3-3.0. If the mole ratio is below 0.3, the materials without pore structures may be obtained due to excess nickel; and if it is higher than 3.0, the preparation of nanoporous materials becomes difficult because of excess phosphorous and the material crystallizable may be dissolved to make it difficult to obtain solid-state materials.

According to the present invention, at least one selected from low-cost inorganic base and monoamine as a pH modifier is used instead of high-cost diamines used as a template in the conventional process. The inorganic base includes hydroxides or oxides of alkaline metal and alkaline earth metal, and ammonias. For example, sodium hydroxide, potassium hydroxide, calcium hydroxide, cesium hydroxide, ammonia, aqueous ammonia and the like may be used. The monoamine includes a tertiary amine such as triethyl amine, tripropyl amine, diisopropylethyl amine and triethanol amine, a secondary amine such as dibutyl amine and dipropyl amine, a primary amine such as heptyl amine, octyl amine and nonyl amine and amine with ring structure such as morpholine, cyclohexyl amine and pyridine. More preferably, the inorganic base is used because it enables to avoid heat treatment after synthesis. Aqueous ammonia or sodium hydroxide is most preferred to be used.

The inorganic base and monoamine used in this invention serve as a pH modifier to readily form the materials necessary for the preparation of VSB-5 molecular sieve. It is preferred that the inorganic base or monoamine be used in the mole ratio of 1.0-10.0 to 1 mole of the nickel compound. If the amount of the base goes beyond the above range, the materials without pores are very likely to be generated.

The present process for preparing VSB-5 molecular sieve as porous solid inorganic material will be described in more detail hereunder.

Firstly, nickel and phosphorous compounds, base and solvent are mixed in a predetermined mole ratio. The mole ratio is adjusted to obtain the composition of 1.0 Ni: (0.3-3.0) P: (1.0-10.0) base: (10-1000) solvent and pH of 7.0-12.0, more preferably, the composition of 1.0 Ni: (0.5-1.0) P: (2.0-8.0) base: (50-150) solvent and pH of 7.0-11.0. pH is adjusted by the addition of the base. If pH is beyond the range, the material without micropores is obtained.

The solvent is at least one selected from the group consisting of water, alcohols such as ethylene glycol, isopropanol and butanol, hydrocarbons such as benzene and n-hexane, carbon tetrachloride and chloroform. More preferably, the solvent is water or butanol, most preferably, water.

Thereafter, the mixture is heated at a high temperature to be crystallized. The crystallization is generally performed at 50-300° C., preferably, 100-250° C., and more preferably, 150-200° C. If the reaction temperature is lower than 50° C., the reaction proceeds extremely slow to require a longer period of time for synthesis; however, if it is performed at a temperature higher than 300° C., the material containing nickel and phosphorous without pores is obtained. As a reactor for heating is used a microwave or an electric heater. If the electric heater is used as a heat source, it is suitable that the reaction time ranges from several hours to several days; and if the microwave is used as heat source, the reaction time ranges from several minutes to several hours.

During the crystallization, agitation may be performed additionally. However, for the convenience of process, the agitation may be circumvented. The agitation is usually performed at a rate of 100-1000 rpm, preferably, at 300-750 rpm. The present process may be carried out in a continuous or a batch manner. If the process is performed for small-scale production, it is appropriate to use a batch reactor; and if the process is performed for large-scale production, it is appropriate to use a continuous reactor. Where the evaporation of the solvent occurs significantly, the pressurized reactor is required to prevent the loss of the solvent.

Finally, the reaction resultant crystallized under the conditions described above is then cooled and subjected to solid liquid separation to yield dried VSB-5 molecular sieve. The cooling process is generally performed at a temperature of 0 to 100° C. The separation of solid product from liquid may be carried out using a centrifuge or a vacuum filter.

If the organic amine is employed as a base, the heat treatment is performed under gas containing air and oxygen or vacuum to remove organic materials contained in pores, so that VSB-5 molecular sieve with high adsorption capacity may be produced. The heat treatment is preferably performed at 200-500° C., more preferably, at 300-450° C. If the temperature for heat treatment is lower than 200° C., the removal of organic materials is not sufficient to give VSB-5 molecular sieve with lower adsorption capacity; and if the temperature is higher than 500° C., the framework of VSB-5 molecular sieve produced is very likely to be disrupted. Where the inorganic base can be used, the heat treatment is not required. This is because the inorganic base is not strongly bound to VSB-5 molecular sieve enough to present in VSB-5 molecular sieve produced and is well dissolved in water. Therefore, the inorganic base can be easily removed from the molecular sieve during the washing process. In this regard, where the inorganic base is used, the production of pure VSB-5 molecular sieve may be accomplished by performing only washing and drying without the heat treatment required in the process using the organic amine.

The VSB-5 molecular sieve produced according to this invention is nanoporous and very useful as a hydrogen storage material, a catalyst, a catalyst supporter and an adsorbent.

The following specific examples are intended to be illustrative of the invention and should not be construed as limiting the scope of the invention as defined by appended claims.

EXAMPLE 1

To nickel chloride hexahydrate ($NiCl_2 \cdot 6H_2O$) in distilled water was added 85% phosphoric acid dropwisely and then aqueous ammonia was added threafter. The reaction proceeded under the conditions indicated Table 1 to obtain the reactant composition of 1.0 Ni: 0.63 P: 3.0 $NH_3$: 100 $H_2O$ (pH 7.7). 30 g of the reactant yielded thus were fed into the Teflon reactor and the reactor was sealed and maintained in a microwave reactor for 4 hr at 180° C. to be crystallized. The reactor was cooled to room temperature (25° C.) and the solid liquid separation was performed to yield VSB-5 molecular sieve.

The BET surface area and ratio of P/(P+Ni) of thus obtained VSB-5 molecular sieve are indicated in Table 1 and its XRD spectrum is represented in FIG. 1.

EXAMPLE 2

The synthesis was carried out as Example 1 under the conditions indicated in Table 1, except that sodium hydroxide was used instead of aqueous ammonia.

The BET surface area and ratio of P/(P+Ni) of thus obtained VSB-5 molecular sieve are indicated in Table 1 and its XRD spectrum is represented in FIG. 1.

EXAMPLE 3

The synthesis was carried out as Example 1 under the conditions indicated in Table 1, except that tri-n-propylamine was used instead of aqueous ammonia.

The BET surface area and ratio of P/(P+Ni) of thus obtained VSB-5 molecular sieve are indicated in Table 1 and its XRD spectrum is represented in FIG. 1.

EXAMPLE 4

The synthesis was carried out as Example 1 under the conditions indicated in Table 1, except that morpholine was used instead of aqueous ammonia.

The BET surface area and ratio of P/(P+Ni) of thus obtained VSB-5 molecular sieve are indicated in Table 1 and its XRD spectrum is represented in FIG. 1.

EXAMPLE 5

The synthesis was carried out as Example 1 under the conditions indicated in Table 1, except that triethyl amine was used instead of aqueous ammonia.

The BET surface area and ratio of P/(P+Ni) of thus obtained VSB-5 molecular sieve are indicated in Table 1.

EXAMPLE 6

The synthesis was carried out as Example 1 under the conditions indicated in Table 1, except that diisopropyl amine was used instead of aqueous ammonia.

The BET surface area and ratio of P/(P+Ni) of thus obtained VSB-5 molecular sieve are indicated in Table 1.

EXAMPLE 7

The synthesis was carried out as Example 1 under the conditions indicated in Table 1, except that triethanol amine was used instead of aqueous ammonia.

The BET surface area and ratio of P/(P+Ni) of thus obtained VSB-5 molecular sieve are indicated in Table 1.

EXAMPLE 8

The synthesis was carried out as Example 1 under the conditions indicated in Table 1, except that cyclohexyl amine was used instead of aqueous ammonia.

The BET surface area and ratio of P/(P+Ni) of thus obtained VSB-5 molecular sieve are indicated in Table 1.

EXAMPLE 9

The synthesis was carried out as Example 1 under the conditions indicated in Table 1, except that an electric heater instead of the microwave heater was used during the crystallization for the heat treatment for 6 days at 180° C.

The BET surface area and ratio of P/(P+Ni) of thus obtained VSB-5 molecular sieve are indicated in Table 1.

EXAMPLE 10

The synthesis was carried out as Example 1 under the conditions indicated in Table 1, except that an electric heater instead of the microwave heater was used for the heat treatment for 6 days at 180° C. and the agitation at 500 rpm was carried out during the crystallization.

The BET surface area and ratio of P/(P+Ni) of thus obtained VSB-5 molecular sieve are indicated in Table 1.

COMPARATIVE EXAMPLE 1

According to the known-procedure in *Angew. Chem. Int. Ed.*, 40:2831-2834(2001), diaminopropane (DAP) was used and an electric heater was used to heat for 6 days at 180° C. Thereafter, solid liquid separation and drying were carried out and the solid thus obtained was calcined for 10 hr under atmosphere of 400° C. to yield VSB-5 molecular sieve.

The BET surface area and ratio of P/(P+Ni) of thus obtained VSB-5 molecular sieve are indicated in Table 1 and its XRD spectrum is represented in FIG. 1.

COMPARATIVE EXAMPLE 2

The synthesis of VSB-5 molecular sieve was carried out as Example 1 under the conditions indicated in Table 1, except that the decreased amount of aqueous ammonia was used to obtain lower pH. The final product was revealed to be $Ni_{11}(HPO_3)_8(OH)_6$ without pores instead of VSB-5 molecular sieve.

The BET surface area and ratio of P/(P+Ni) of thus obtained material are indicated in Table 1.

COMPARATIVE EXAMPLE 3

The synthesis of VSB-5 molecular sieve was carried out as Example 1 under the conditions indicated in Table 1, except that the increased amount of aqueous ammonia was used to obtain higher pH. The final product was revealed to be $(NH_4)Ni(PO_4)(H_2O)$ without pores instead of VSB-5 molecular sieve.

The BET surface area and ratio of P/(P+Ni) of thus obtained material are indicated in Table 1.

COMPARATIVE EXAMPLE 4

The synthesis of VSB-5 molecular sieve was carried out as Example 4 under the conditions indicated in Table 1, except that di-n-pentyl amine was used instead of morpholine. The final product was revealed to be $Ni_{11}(HPO_3)_8(OH)_6$ without pores instead of VSB-5 molecular sieve.

The BET surface area and ratio of P/(P+Ni) of thus obtained material are indicated in Table 1.

COMPARATIVE EXAMPLE 5

The synthesis of VSB-5 molecular sieve was carried out as Example 4 under the conditions indicated in Table 1, except that acetonitrile was used instead of morpholine. The final product was revealed to be a material in the form of liquid instead of VSB-5 molecular sieve.

The BET surface area and ratio of P/(P+Ni) of thus obtained material are indicated in Table 1.

TABLE 1

| | | Reaction conditions | | | | Results | | |
|---|---|---|---|---|---|---|---|---|
| Example | Base | Composition (mole) | PH | Temp (° C.) | Time (h) | pH | BET SA[d] ($m^2$/g) | Composition[e] |
| Ex. 1 | Aq. ammonia | 1Ni:0.63P: 3.0Base:100$H_2O$ | 7.7 | 180 | 4 | 7.8 | 400[b] | 33.8 |
| Ex. 2 | NaOH | 1Ni:0.63P: 2.5Base:100$H_2O$ | 7.8 | 180 | 4 | 7.9 | 210[b] | 33.6 |
| Ex. 3 | Tri-n-propyl amine | 1Ni:0.63P: 6Base:100$H_2O$ | 8.5 | 180 | 4 | ND[a] | ND[a] | ND[a] |

TABLE 1-continued

| | | Reaction conditions | | | | Results | | |
| --- | --- | --- | --- | --- | --- | --- | --- | --- |
| Example | Base | Composition (mole) | PH | Temp (° C.) | Time (h) | pH | BET SA[d] (m²/g) | Composition[e] |
| Ex. 4 | Morpholine | 1Ni:0.63P:7Base:100H$_2$O | ND[a] | 180 | 4 | 9.1 | ND[a] | ND[a] |
| Ex. 5 | Triethylamine | 1Ni:0.63P:7Base:100H$_2$O | 10.5 | 180 | 4 | 9.9 | ND[a] | ND[a] |
| Exa. 6 | di-i-propyl ethyl amine | 1Ni:0.63P:7Base:100H$_2$O | ND[a] | 180 | 4 | ND[a] | ND[a] | ND[a] |
| Ex. 7 | Triethanol amine | 1Ni:0.63P:7Base:100H$_2$O | ND[a] | 180 | 4 | 8.1 | ND[a] | ND[a] |
| Ex. 8 | Cyclohexyl amine | 1Ni:0.63P:7Base:100H$_2$O | 10.4 | 180 | 4 | 10.4 | ND[a] | ND[a] |
| Ex. 9[f] | Aq. Ammonia | 1Ni:0.63P:3Base:100H$_2$O | 7.7 | 180 | 144 | 7.7 | 380[b] | 34.1 |
| Ex. 10[g] | Aq. Ammonia | 1Ni:0.63P:3Base:100H$_2$O | 7.7 | 180 | 144 | 7.7 | 400[b] | 33.2 |
| Com. Ex. 1[h] | 1,3-diamino propane | 1Ni:2.1P:5.2Base:140H$_2$O | 10.5 | 180 | 144 | 10.3 | 300[c] | 33.9 |
| Com. Ex. 2[i] | Aq. Ammonia | 1Ni:0.63P:1.5Base:100H$_2$O | 3.8 | 180 | 4 | 2.0 | ND[a] | ND[a] |
| Com. Ex. 3[j] | Aq. Ammonia | 1Ni:0.63P:15Base:100H$_2$O | 12.1 | 180 | 4 | 12.5 | ND[a] | ND[a] |
| Com. Ex. 4[k] | di-n-pentyl amine | 1Ni:0.63P:7Base:100H$_2$O | 8.7 | 180 | 4 | 8.6 | ND[a] | ND[a] |
| Com. Ex. 5[l] | acetonitrile | 1Ni:0.63P:7Base:100H$_2$O | 8.5 | 180 | 4 | 8.5 | ND[a] | ND[a] |

ND[a] not determined,
[b]BET surface area of sample as synthesized
[c]BET surface area of sample as activated,
[d]BET surface area,
[e]composition (P/(P + Ni), element %),
[f]electric heater used,
[g]electric heater used and agitating,
[h]electric heater used,
[i]crowded structure, Ni$_{11}$(HPO$_3$)$_8$(OH)$_6$ structure,
[j]crowded structure, (NH$_4$)Ni(PO$_4$)(H$_2$O) structure,
[k]crowded structure, Ni$_{11}$(HPO$_3$)$_8$(OH)$_6$ structure,
[l]not forming solid.

As indicated in Table 1, the VSB-5 molecular sieves obtained from Examples 1-10 using low-cost inorganic base and suitable monoamine as base show physical properties similar to that obtained from Comparative Example 1 according to the conventional procedure, such as BET surface area to indicate microporosity, the composition of molecular sieve framework and the P/(P+Ni) ratio to indicate purity, and show XRD spectrum patterns similar to that obtained from Comparative Example 1 as represented in FIG. 1. These results demonstrate that VSB-5 molecular sieves can be readily prepared at lower cost. Comparative Example 1 used high-cost diamine, required a larger amount of DAP due to excessive phosphoric acid and demanded the sintering of organic compound at high temperature, which renders the conventional process uneconomic. However, as described above, the present invention appears to be very economic.

In Comparative Example 2 using the base, where the amount goes beyond the amount range of the base in the present invention, Ni$_{11}$(HPO$_3$)$_8$(OH)$_6$ structure without pores instead of pure VSB-5 molecular sieve was obtained as represented in XRD spectrum.

In addition, it would be understood from XRD spectrum that (NH$_4$)Ni(PO$_4$)(H$_2$O) structure without pores instead of pure VSB-5 molecular sieve was obtained in Comparative Example 3. Therefore, it could be appreciated that it is difficult to yield VSB-5 with pores at excessively low or high pH conditions.

In Comparative Examples 4 and 5, Ni$_{11}$(HPO$_3$)$_8$(OH)$_6$ structure without pores and liquid were yielded, respectively. Hence, it is to be noted that the selection of amine used is critical along with a suitable pH condition to accomplish the advantages associated with the present invention, As described previously, the present process for preparing VSB-5 molecular sieve is performed by use of low-cost inorganic base or monoamine under the adjustment of pH and can avoid post-heat treatment. Therefore, the present process could be carried out in an economical and efficient manner, to produce VSB-5 molecular sieves useful as a hydrogen storage material, a catalyst, a catalyst supporter and an adsorbent.

What is claimed is:

1. A process for preparing a VSB-5 molecular sieve by crystallizing a nickel compound and a phosphorous compound with a base, wherein said base is an inorganic base or monoamine and said crystallizing is performed at a temperature ranging from 50 to 350° C. and pH of 7.0 to 12.0.

2. The process according to claim 1, wherein said inorganic base is selected from the group consisting of ammonia, aqueous ammonia, sodium hydroxide, potassium hydroxide, magnesium hydroxide and calcium hydroxide.

3. The process according to claim 1, wherein said monoamine is selected from the group consisting of triethyl amine, tri-n-propyl amine, diisopropyl amine, triethanol amine, morpholine and cyclohexyl amine.

4. The process according to claim 1, wherein said base is employed in the mole ratio of 1.0-10.0 to 1 mole of said nickel compound.

5. The process according to claim 1, wherein said phosphorous compound is employed in the mole ratio of 0.3-3.0 to 1 mole of said nickel compound.

6. The process according to claim 1, wherein said heating is carried out using a microwave or electric heater.

7. The process according to claim 1, wherein, during said crystallizing, said reactants are agitated at a rate of 100-1000 rpm.

8. The process according to claim 1, wherein a crystallized product from said process using said inorganic base is not subjected to heat treatment.

* * * * *